(12) United States Patent
Hipp

(10) Patent No.: US 11,027,745 B2
(45) Date of Patent: Jun. 8, 2021

(54) INDIRECT VEHICLE PARAMETRIZATION VIA USER PROFILES

(71) Applicant: Bayerische Motoren Werke Aktiengesellschaft, Munich (DE)

(72) Inventor: Walter Hipp, Kottgeisering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 111 days.

(21) Appl. No.: 15/412,202

(22) Filed: Jan. 23, 2017

(65) Prior Publication Data

US 2017/0129500 A1 May 11, 2017

Related U.S. Application Data

(63) Continuation of application No. PCT/EP2015/066006, filed on Jul. 14, 2015.

(30) Foreign Application Priority Data

Jul. 24, 2014 (DE) ..................... 10 2014 214 559.7

(51) Int. Cl.
*B60W 50/08* (2020.01)
*B60K 37/04* (2006.01)
(Continued)

(52) U.S. Cl.
CPC ........... *B60W 50/085* (2013.01); *B60K 35/00* (2013.01); *B60K 37/04* (2013.01);
(Continued)

(58) Field of Classification Search
CPC ....... B60W 50/085; B60W 2040/0809; B60W 40/09; B60K 35/00; B60K 37/04;
(Continued)

(56) References Cited

U.S. PATENT DOCUMENTS 5,172,785 A 12/1992 Takahashi
5,513,107 A 4/1996 Gormley
(Continued)

FOREIGN PATENT DOCUMENTS

DE 41 20 069 A1 1/1992
DE 43 40 289 A1 6/1994
(Continued)

OTHER PUBLICATIONS

International Search Report (PCT/ISA/210) issued in PCT Application No. PCT/EP2015/066006 dated Dec. 10, 2015 with English translation (five pages).

(Continued)

*Primary Examiner* — Michael V Kerrigan
(74) *Attorney, Agent, or Firm* — Crowell & Moring LLP

(57) ABSTRACT

A method and corresponding device are provided for setting configurable parameters of a system, for example a vehicle. The method is used to establish a user-specific value of a system parameter of the system. The method determines a user profile of a user. The user profile includes user-specific values of one or more user parameters which describe one or more properties of the user of the system. The method prepares a mapping function which maps different values of the one or more user parameters of the user profile onto different values of the system parameters. The method determines the user-specific value of the system parameter for the user, on the basis of the user profile of the user and on the basis of the mapping function.

11 Claims, 2 Drawing Sheets

(51) Int. Cl.
  *B60K 35/00* (2006.01)
  *B60W 40/09* (2012.01)
  *B60W 40/08* (2012.01)
  *G06F 3/0484* (2013.01)

(52) U.S. Cl.
  CPC ...... *B60K 2370/52* (2019.05); *B60K 2370/73* (2019.05); *B60W 40/09* (2013.01); *B60W 2040/0809* (2013.01); *G06F 3/04847* (2013.01)

(58) Field of Classification Search
  CPC .......... B60K 2350/352; B60K 2370/73; B60K 2370/52; G06F 3/04847
  See application file for complete search history.

(56) References Cited

U.S. PATENT DOCUMENTS

| | | | |
|---|---|---|---|
| 6,356,812 B1 | 3/2002 | Cragun | |
| 6,449,572 B1 | 9/2002 | Kurz et al. | |
| 9,229,905 B1 * | 1/2016 | Penilla | G06F 17/00 |
| 9,821,791 B2 * | 11/2017 | Dextreit | B60W 50/0097 |
| 2014/0309862 A1 * | 10/2014 | Ricci | G01C 21/26 701/36 |
| 2015/0191178 A1 * | 7/2015 | Roy | B60W 40/09 701/36 |

FOREIGN PATENT DOCUMENTS

| | | |
|---|---|---|
| DE | 198 11 244 A1 | 9/1998 |
| DE | 198 60 248 C1 | 3/2000 |
| DE | 100 64 937 A1 | 7/2002 |
| DE | 10 2004 040 829 A1 | 3/2006 |
| WO | WO-2013110709 A1 * | 8/2013 ........ B60W 50/0097 |

OTHER PUBLICATIONS

German-language Written Opinion (PCT/ISA/237) issued in PCT Application No. PCT/EP2015/066006 dated Dec. 10, 2015 (five pages).

German Search Report issued in counterpart German Application No. 10 2014 214 559.7 dated Apr. 8, 2015 with partial English translation (12 pages).

\* cited by examiner

INDIRECT VEHICLE PARAMETRIZATION VIA USER PROFILES

CROSS REFERENCE TO RELATED APPLICATIONS

This application is a continuation of PCT International Application No. PCT/EP2015/066006, filed Jul. 14, 2015, which claims priority under 35 U.S.C. § 119 from German Patent Application No. 10 2014 214 559.7, filed Jul. 24, 2014, the entire disclosures of which are herein expressly incorporated by reference.

BACKGROUND AND SUMMARY OF THE INVENTION

The invention relates to a method and a corresponding device for adjusting configurable parameters of a vehicle.

In a vehicle, there are typically various possibilities of changing the values of parameters. This can be done by means of individual operating elements in the cockpit, e.g. by means of a driving-related switch or by selecting menu items in an infotainment system of the vehicle in order to distinguish, e.g., whether only the driver door or all of the doors of the vehicle are unlocked with a first key press on a remote control of the vehicle.

In order not to tax the user (particularly the driver), the number of these possible adjustments must not exceed a certain measure, however. This applies, in particular, against the background that users are predominantly only in the vehicle while it is being driven. More rarely do users take the time to perform adjustments while the vehicle is standing still.

This restriction contradicts the desire of the user to fully exploit the possibilities of the vehicle. In addition, this restriction represents an obstacle to further innovations in the vehicle since additional functions of the vehicle are frequently associated with additional possible adjustments.

The present document deals with the technical task of enabling a user of a system, particularly of a vehicle, to specify values for a multiplicity of configurable parameters of the system in an efficient and individual manner. This enables the number of configurable parameters, and thus also the number of available system functions, to be increased. Furthermore, it thus becomes possible to adapt a system more extensively to different users of the system.

This and other objects are achieved by a method for specifying a user-specific value of a system parameter of a system, the method comprising determining the user profile of a user wherein the user profile comprises user-specific values of one or more user parameters which describe one or more characteristics of the user of the system; providing a mapping function which maps different values of the one or more user parameters of the user profile to different values of the system parameter; and determining the user-specific value of the system parameter for the user, on the basis of the user profile of the user and on the basis of the mapping function.

According to one aspect, a method for specifying a user-specific value of a system parameter of a system is described. In this context, the system can be a vehicle, particularly a road vehicle such as a passenger motor vehicle, a truck or a motorcycle. In this case, the system parameter can be a vehicle parameter. A system parameter can be a configurable parameter which specifies the operation of the system (particularly the operation of a particular function of the system).

The method includes the determining of a user profile of a user. In this context, the user profile comprises user-specific values of one or more user parameters. A user parameter here describes a characteristic and/or a behavior of the user. The one or more user parameters are typically independent of the system parameter of the system. In particular, specifying a value for a user parameter does not correspond to specifying a value for the system parameter.

The user profile can be determined, for example, via an input/output unit of the system. One example of the input/output unit is the infotainment system of a vehicle. In a first mode (also called "user profile" view), the input/output unit can enable the user to specify the user-specific values for the one or more user parameters. Determining the user profile can thus include acquiring the user-specific values of the one or more user parameters via a user interface, wherein the user interface can be provided via the input/output unit of the system. In particular, determining of the user profile can include displaying a visual user interface for specifying the user-specific values of the one or more user parameters on a screen of the input/output unit and acquiring the specified user-specific values of the one or more user parameters via an input unit (e.g. via a keyboard or a rotary knob) of the input/output unit.

The method also includes providing a mapping function for the system parameter. The mapping function here maps different values of one or more user parameters of the user profile to different values of the system parameter. The mapping function can be stored on a storage unit of the system. The mapping function can be provided, e.g., by a manufacturer of the system.

Furthermore, the method includes determining the user-specific value of the system parameter for the user, on the basis of the user profile of the user and on the basis of the mapping function. In particular, the user-specific value of the system parameter can be determined as functional value of the mapping function for the user-specific values of the one or more user parameters of the user profile of the user.

The user-specific value of a system parameter can thus be determined efficiently by specifying/providing a user profile and providing a mapping function. In this context, the outlay for specifying the user-specific values of the system parameters is independent of the number of system parameters and the values of a relatively high number of system parameters can be specified user-specifically in an efficient manner by the method described.

In particular, in this connection the method can include the providing of a multiplicity of mapping functions for a corresponding multiplicity of system parameters. Furthermore, the method can include the determining of user-specific values of the multiplicity of system parameters for the user on the basis of the user profile of the user and on the basis of the multiplicity of mapping functions. In this context, the respective mapping function of a particular system parameter can be utilized for determining the value of the particular system parameter. Specifying the values of a (limited) number of user parameters is sufficient for determining the values of the multiplicity of system parameters. In this context, the number of system parameters can be greater than the number of user parameters. Nevertheless, the expenditure for specifying the user-specific values of the system parameters by the number of user parameters is limited.

The method can furthermore include outputting the user-specific value of the system parameter to the user. This can be done, e.g., by use of the input/output unit of the system. Thus, it is possible to inform the user, if necessary, which value has been specified for the system parameter in dependence on their user profile. Furthermore, the user can change the value of the system parameter, if necessary, by the input/output unit. Manual changing of the value determined automatically for the system parameter can be used for adapting the user profile of the user to the actual behavior actual characteristics of the user.

According to a further aspect, a device for specifying a user-specific value of a system parameter of a system (particularly of a vehicle) is described. The device (particularly a control unit of the device) can be configured to determine a user profile of a user. In this context, the user profile includes user-specific values of one or more user parameters which describe one or more characteristics of the user of the system. Furthermore, the device is configured to provide a mapping function which is configured to map different values of the one or more user parameters of the user profile to different values of the system parameter. In addition, the device is configured to determine the user-specific value of the system parameter for the user on the basis of the user profile of the user and on the basis of the mapping function.

The device can include an input/output unit which enables the user to specify the user-specific values of the one or more user parameters in a first mode (e.g. in a "user profile" view). After specification of the user-specific values for the one or more user parameters, the user-specific values can be determined for the system parameter (with the mapping function for the system parameter). Alternatively or additionally, the input/output unit can enable the user to specify the user-specific value of the system parameter in a second mode (e.g. in a "system profile" view). Thus, a user-specific value of the system parameter determined automatically via the mapping function can, if appropriate, be modified by the user.

The device can be configured to acquire data with respect to a behavior of the user. In particular, data with respect to the behavior of the user can be acquired during the specification of values for one or more system parameters (e.g. during the manual changing of values of system parameters specified automatically). The user-specific values of the one or more user parameters can then be determined and/or adapted on the basis of the data acquired. Thus, the user profile can be adapted efficiently to the actual behavior of the user. This then leads to a better adaptation of the values of the system parameters to the needs/preferences of the user.

According to a further aspect, a vehicle (e.g. a passenger motor vehicle, a truck or a motorcycle) is described which includes the device described in the present document.

According to a further aspect, a software (SW) program is described. The SW program can be configured to be executed on a processor (e.g. on a control unit of a vehicle) in order to carry out the method described in the present document.

According to a further aspect, a storage medium is described. The storage medium can has stored thereon an SW program which is configured to be executed on a processor to carry out the method described in the present document.

It should be noted that the methods, devices and systems described in the present document can be used both by themselves and in combination with other methods, devices and systems described in the present document. Furthermore, any aspects of the methods, device and systems described in the present document can be combined with one another in various ways.

Other objects, advantages and novel features of the present invention will become apparent from the following detailed description of one or more preferred embodiments when considered in conjunction with the accompanying drawings.

DETAILED DESCRIPTION OF THE DRAWINGS

As specified initially, the present document deals with enabling the user of a vehicle to specify individually values for a highest possible number of configurable parameters by a smallest possible number of inputs. In particular, the user should be enabled to set any number of vehicle parameters individually, i.e. matched to the user, by a finite number of inputs or default settings.

Figure 1:
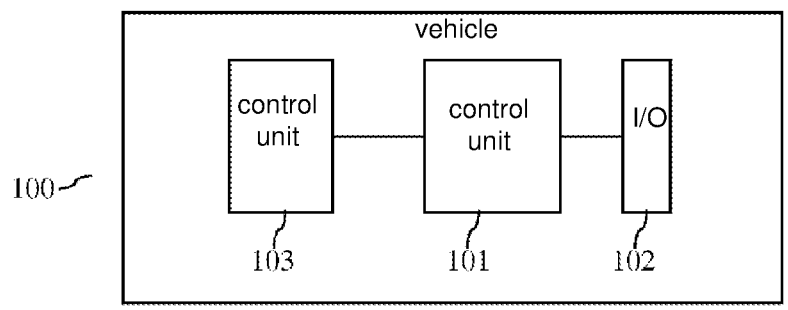
FIG. 1 is a schematic block diagram of exemplary components of a vehicle.

FIG. 1 shows a block diagram with exemplary components of a vehicle 100. The vehicle 100 includes an input/output unit 102 which is configured to output a menu for the input of vehicle parameters (e.g. on display on a screen of the input/output unit 102). The input/output unit 102 is also configured to acquire an input of a user of the vehicle 100 (e.g. via a keyboard or a selection knob of the input/output unit 102). The input/output unit 102 can thus be configured to enable a user to specify the values of one or more vehicle parameters by navigation in a menu displayed.

The vehicle 100 also includes a control unit 101 which is configured to cause the input/output unit 102 to output the menu to the user and to determine values of the one or more vehicle parameters specified via the input/output unit 102 (e.g. to receive from the input/output unit 102). Furthermore, the control unit 101 is configured to forward the specified values of the one or more vehicle parameters to corresponding one or more control units 103 (e.g. control devices) of the vehicle so that one or more functions of the vehicle are provided in accordance with the specified values of the one or more vehicle parameters.

Figure 2A:
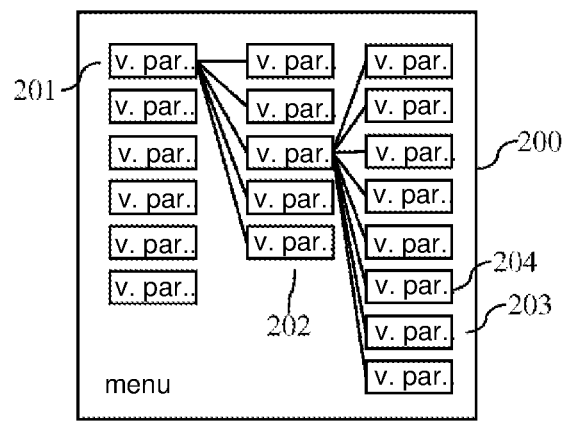
FIG. 2A is a schematic diagram of an exemplary menu for specifying values of vehicle parameters.

FIG. 2A shows an exemplary menu 200. The menu 200 can have a multiplicity of menu levels 201, 202, 203 (e.g. a main menu 201 and a sub-menu 202). Furthermore, the menu 200 includes a parameter level 203 in which the values for individual vehicle parameters 204 can be specified. The menu items of the menu 200 shown in FIG. 2A can be output via the input/output unit 102, the menu level 201, 202, 203 output being dependent on the inputs of a user of the vehicle 100. From FIG. 2A it can be seen that specifying values for the one or more vehicle parameters 204 by way of a displayed menu 200 can be time consuming. Furthermore, specifying parameter values by way of a menu 200 requires that the user of the vehicle 100 knows the structure of the menu 200.

To simplify the individual specification of the value of a vehicle parameter 204, use of an abstraction layer between the user and the vehicle parameters 204 is provided. Instead of adjusting all parameters 204 individually, one user profile, i.e. one profile of the user, is determined. Some or all vehicle parameters 204 then receive a presetting which corresponds to the profile of the user via a mapping rule.

The user profile can be specified explicitly by notes from the user (e.g. by inputs of the user). Alternatively or additionally, the user profile can be specified implicitly by an automation function which analyzes the user behavior.

The user profile is described by a limited number of user parameters. In this context, the user parameters are independent of one another, if possible, in order to provide as complete as possible an image of characteristics of the user. For each user parameter, an expression in a multiplicity (e.g. approx. 5) stages (e.g. ++, +, medium, −, −−) can be specified.

Exemplary user parameters are: the height of the energy level/control intensity; comfort versus sportiness; desired intensity of individualization/specialization; desired extent of driver assistance/intensity of automation; desired depth of information; and/or learning behavior of the user.

Figure 2B:
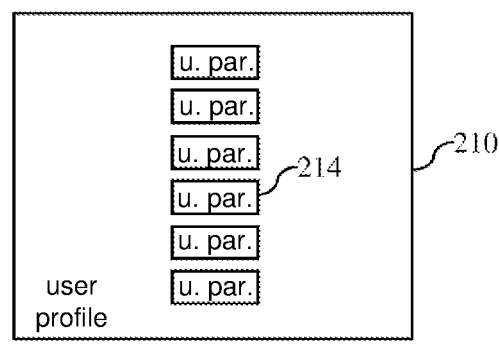
FIG. 2B is a schematic diagram of an exemplary list for specifying the profile of a user.

FIG. 2B shows an exemplary user profile 210. The user profile 210 describes characteristics of the user of the vehicle 100. For this purpose, the user profile 210 can include one or more user parameters 214 which describe in each case a characteristic of the user. The control unit 101 can be configured to cause the input/output unit 102 to output an input mask for specifying the user profile 210, and to convey user-specific values of the one or more user parameters 214. Thus, the user profile 210 of the user can be determined via the input/output unit 102, for example when the vehicle 210 is put into operation.

The user profile 210 is typically independent of the vehicle parameters 204. The user profile 210 describes characteristics and/or behavior of the user of the vehicle without direct reference to the vehicle parameters 204. The control unit 101 can be configured to provide a mapping function or a mapping rule which makes it possible to determine user-specific values for one or more vehicle parameters 204 on the basis of the user profile 210. In particular, the user-specific values of all configurable vehicle parameters 204 can be determined and specified, if necessary, by means of the mapping rule.

This approach enables values of an arbitrary number of vehicle parameters 204 to be specified. For this purpose, one mapping function can be defined and/or provided per vehicle parameter 204 which maps the user parameters 214 of the user profile 210 to the possible range of values of the respective vehicle parameter 204. If such a function cannot be provided for a vehicle parameter 204, a preset (default) value can be specified for the vehicle parameter 204.

In addition, the user can also be provided with the possibility of changing individual vehicle parameters 204 individually via the menu 200. In this way, parameters 204 can also be set which can possibly not be determined from the user profile 210. In this context, it may be advantageous to provide various detailing levels in the user guide. In this context, a low detailing level can communicate only the most important or most frequently to be changed vehicle parameters whereas the highest detailing level may be of interest to users who wish to become familiar with all details of their vehicle 100.

The user can thus be provided with two views for specifying vehicle parameters 204. Via the "user profile" view, the user can check and possibly change the user parameters 214 of the user profile 210. A change of a user parameter 214 here typically has an effect on the value of one or more vehicle parameters 204. Via the "vehicle profile" view, the user can check, and possibly change, the values of the vehicle parameters 204 directly. For reasons of scaling, it can be advantageous for the "vehicle profile" view to provide in addition to the traditional functional menu hierarchy 200, also an alphabetical list and a search function for vehicle parameters 204. This makes it possible to provide a fast access to any vehicle parameter 204.

The user profile 210 described in the present document differs from user profiles in other areas, the latter being used for describing user settings of a device. As a rule, the user profile is here an actual configuration of the available parameters of the device. In contrast, the method described in the present document is based on an abstraction layer. The method described uses two different profiles: a user profile 210 which includes a limited (small) number of user parameters 214 which characterize the user; and a vehicle profile which includes a (high) number of vehicle parameters 204 which specify the behavior of the vehicle 100.

The user profile 210 describes an actual configuration $\{bp_1, bp_2, bp_n\}$ of the n user parameters $bp_j$ 214 of the abstraction layer. The user parameters $bp_j$ 214 are initially independent of the vehicle parameters $fp_i$ 204. The relationship between user parameters $bp_j$ 214 and vehicle parameters $fp_i$ 204 is established by a translation step (i.e. by the mapping function(s)) which establishes per vehicle parameter a mapping rule $f_i$ between a determined user profile 210 (definition set D) and the range of values of the vehicle parameter (target set $Z_i$). Thus, the following applies:

$$fp_i = f_i(bp_1, bp_2, \ldots, bp_n) \text{ where } f_i : D \to Z_i$$

It is assumed that the vehicle parameters 204 are not completely independent of one another. An informed user will thus not set the individual vehicle parameters 204 arbitrarily but change related vehicle parameters 204 in the same manner. In fact, not taking the dependencies between particular vehicle parameters 204 into consideration would lead to an unbalanced vehicle configuration.

Due to the dependencies between vehicle parameters 204, it is sufficient to specify values for a limited (finite) number of user parameters 214 which may possibly cover the sum of the independent decisions of the user 204. Thus, values for an arbitrary number of vehicle parameters 204 can be calculated and specified via the mapping rule. The vehicle configuration resulting from this is automatically balanced since dependencies between the vehicle parameters 204 can be taken into consideration indirectly via similarities in their mapping rules.

It is also possible to acquire dependencies between vehicle parameters 204 explicitly. These dependencies can possibly lead to a cleaning up of the vehicle configuration.

To determine meaningful user parameters 214 for a user profile 210, the multiplicity of configurable vehicle parameters 214 can first be taken into consideration. The configurable vehicle parameters 214 result from e.g. the personalization options which are provided via the infotainment system of a vehicle 100 from available operating elements in the cockpit of the vehicle 100 and/or via coding switches or personalization parameters present in the vehicle software.

Looked at mathematically, the values of the vehicle parameters 204 span a vector space which is described by linearly independent unit vectors. For each unit vector of the vehicle parameter vector space, one user parameter 214 can be provided so that the total vector space of the vehicle parameters 204 can be described by a limited number of user parameters 214. In other words, the user parameters 214 can be selected in such a manner that they are independent of one another and that the total set of user parameters 214 enables the values of all vehicle parameters 204 to be detected. For this purpose, the user parameters 214 described in the present document can be used, in particular.

Furthermore, for each vehicle parameter 204 to be taken into consideration, a function can be defined which maps one or more of the user parameters 214 to the range of values of the vehicle parameter 204. Should this not be possible (e.g. because the vehicle parameter 204 is independent of the user parameters 214), an additional user parameter 214 can be introduced and/or the vehicle parameter 204 can be removed from the set of vehicle parameters 204 to be taken into consideration.

Finally, the defined user parameters 214 can be considered again and possibly changed again in order to reduce their number and/or to achieve a greater independence of the user parameters 214 from one another, if necessary.

The method for selecting the vehicle parameters 204 to be taken into consideration, the set of user parameters 214 and the mapping functions can be repeated iteratively until a result is achieved with which, with as low a number of user parameters 214 as possible, the values of as great a number of vehicle parameters 204 as possible can be specified. In particular, a compromise between a clear, narrow configuration option (with fewer user parameters 214) and the coverage of as many vehicle parameters 204 as possible can be provided. One clue for a possible required number of user parameters 214 is the Miller number (7±2), which designates the number of information units which a person can process simultaneously.

Furthermore, it is possible to acquire dependencies between vehicle parameters 204 explicitly. In this connection, initial values of the vehicle parameters 204 can be determined first from the user parameters 214 by means of the mapping rules. Furthermore, existing dependency rules can be applied for checking the values of individual vehicle parameters 204 and possibly modifying them.

Altogether, it is thus possible to:
- determine approx. 7±2 user parameters 214 which describe the user profile 210 of a user;
- determine a set of vehicle parameters 204 for which mapping functions can be provided which map the user parameters 214 onto the range of values of the vehicle parameters 204;
- if necessary, determine a set of vehicle parameters 204, the values of which cannot or should not be specified by the user profile 210; for these vehicle parameters 204, a standard setting can be defined;
- if necessary, provide one or more explicit rules between dependent vehicle parameters 204.

In the text which follows, exemplary user parameters 214 are listed. Furthermore, it is explained which components and/or aspects of a vehicle 100 are affected especially strongly by the respective user parameters 214. Typically, there is no 1:1 correlation between a user parameter 214 and a vehicle parameter 204. Instead, a mapping rule must be typically specified from a number of (possibly all) user parameters 214 for each individual vehicle parameter 204.

User parameters: height of the energy level/control intensity
- this user parameter 214 can provide information on whether the user handles energy sparingly or not;
- the energy level consumed can be high vs. low in tendency;
- a control intensity of the system can be offensive vs. restrained;
- this user parameter 214 affects, e.g., the following vehicle parameters 204:
  - eco-mode, e.g. navigation, consumer, "sailing" state of driving;
  - driving dynamics, e.g. switching times;
  - air conditioning, e.g. heating/cooling power, blower intensity;
  - light functions, e.g. home lamps;

User parameters: comfort vs. sportiness
- this user parameter 214 specifies whether the user likes to move in a sporting manner or places high value on comfort;
- the user parameter 214 can accept values between sporting vs. comfortable; and/or dynamic vs. comfortable;
- the user parameter 214 affects, e.g. the following vehicle parameters 204:
  - driving dynamics, e.g. suspension/damping, steering;
  - navigation;
  - setting of the seat sides;

User parameters: intensity of the individualization/specialization
- this user parameter 214 indicates whether the user is inclined to adapt commodities to personal preferences or not;
- the user parameter 214 can assume values of between high or low specialization;
- the user parameter 214 affects, e.g., the following vehicle parameters 204:
  - storage of the history, e.g. navigation, multimedia, air conditioning;
  - the use of adapted setting vs. standard settings; it is specified, e.g., whether user settings are either temporary (for the current trip) or are permanently stored or stored personalized, e.g. settings of the seat, of the outside mirror and/or of the steering;
  - settings for the ambient light;
  - activation of special functions, e.g. tipped flashing;

User parameters: driver assistance/intensity of automation
- the user parameter 214 indicates whether a user tends to use assistance functions or not;
- the user parameter 214 can assume values of between high or low inclination;
- the user parameter 214 affects, e.g. the following vehicle parameters 204:
  - driver assistance: assisting vs. not assisting;
  - activation of particular subsystems (lane departure assistant, lane change warning, access warning, personal warning, driver monitoring);
  - early vs. late intervention of an assistance function;
  - automation vs. manual operation, e.g. air conditioning and/or adaptation of audio volume to speed;

User parameters: depth of information
- the user parameter 214 indicates whether a user is interested in detailed information or not;
- the user parameter 214 can assume values between a distinct interest in details vs. no interest in details;
- the user parameter 214 affects, e.g. the following vehicle parameters 204;
  - display of a high degree of detail in information vs. only the most important information being displayed (parts of the display may also be masked out);
  - display of notes, messages, tips (e.g. switching assistant), navigation (e.g. points of interest);
  - questions regarding options, e.g. of the provision of alternative routes;
  - activation of sub-functions of the on-board computer;

User parameters: learning behavior
- the user parameter 214 indicates whether a user is interested in trainable systems or not;

the user parameter 214 can assume values between a trainable system vs. a system having fixed settings;

in distinction to the user parameters 214 hitherto described, this user parameter 214 can affect the forms of the other user parameters 214:

a trainable system can analyze the user behavior and thus explicitly specify the form of some user parameters 214;

a weakly trainable system typically modifies the manually specified user parameters 214 only slightly;

a non-trainable system permanently retains the manually preset settings.

In the text which follows, exemplary mapping rules are described.

Mapping rule for vehicle parameter 204 "lane departure warning":

possible range of values of the vehicle parameter {not active, active};

mapping rule:

if the value of the user parameter 214 "driver assistance">="medium", select the value of the vehicle parameter 204 "lane departure warning"="active";

otherwise, select the value of the vehicle parameter 204 "lane departure warning"="not active".

Mapping rule for vehicle parameter 204 "warning time of the lane departure warning":

possible range of values of the vehicle parameter {late, medium, early};

mapping rule:

if the value of the user parameter 214 "driver assistance">="+" or if the values of user parameters 214 ("driver assistance"="medium" and "depth of information">="+"), select vehicle parameter 204 "warning time"="early", otherwise, if the value of user parameter 214 "driver assistance"="medium" and "depth of information"="medium", select vehicle parameter 204 "warning time"="medium", otherwise, select vehicle parameter 204 "warning time"="late".

In the text which follows, it is shown by way of example how values for vehicle parameters 204 of the vehicle 100 can be specified using the method described in the present document.

For creating a user profile 210 (e.g. when putting the vehicle 100 into operation), the user can select the "user profile" view of a user interface. The user can then specify values for some or all user parameters 214. After creating a user profile 210, the user can be offered a function "determine vehicle parameters" which can be selected by the user. By means of the user profile 210 and by means of predefined mapping functions, all vehicle parameters 204 which can be determined on the basis of the user profile 210 are then calculated and specified.

For the testing and fine adjustment of the vehicle parameters 204, the user can choose the "vehicle profile" view in the user interface. In this view, the vehicle parameters 204 can be selected and set via a menu 200. The user can thus test and possibly change the configuration of the individual vehicle parameters 204.

If necessary, the user can change an existing user profile 210. For this purpose, the user can select the "user profile" view and change the setting of one or more user parameters 214. With reference to a subsequent recalculation of the values of the vehicle parameters 204, a number of options are contemplated. For example, there can be a complete recalculation, i.e. the values of all vehicle parameters 204 can be recalculated in accordance with the changed user profile 210. Alternatively, only the values of those vehicle parameters 204 can be recalculated which have not already been specified individually via the "vehicle profile" view.

The determined and/or specified values of the vehicle parameters 204 can be stored personalized. Additionally, the values of the user parameters 214 can also be stored personalized. A user may optionally produce a multiplicity of different user profiles 210 between which the user can change in a simple manner and can thus also change the settings of the vehicle parameters 204.

The values of vehicle parameters 204 and/or the values of user parameters 214 (i.e., in particular, the user profile 210) can be transferred to other vehicles 100 via a data carrier and/or by an identification of the user. In this context, the values can be accepted directly for compatible vehicle parameters 204. Values for vehicle parameters 204 of the new vehicle 100 which do not exist in the previous vehicle 100 can be calculated from the user profile 210.

For basic settings of a vehicle 100, one or more separate user parameters 214 can be used, if necessary. By this means, e.g. country settings including the conventional systems of units can be specified, for example.

Depending on combinations of equipment and country-specific regulations, it may be that the values are obligatorily predetermined for certain vehicle parameters 204. Accordingly, no changes based on the user profile 210 can be performed for these parameters 204. For this purpose, these parameters 204 can be taken out of the set of vehicle parameters 204 to be acquired via a user profile 210.

Figure 3:
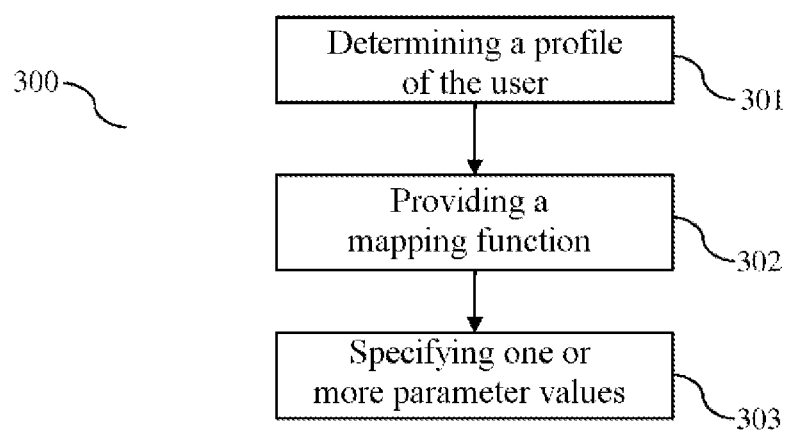
FIG. 3 is a flowchart of an exemplary method for specifying values of one or more vehicle parameters.

FIG. 3 shows a flowchart of an exemplary method 300 for specifying a user-specific value of a system parameter 204 of a system 100. The system 100 can be, in particular, a vehicle and the system parameter 204 can be a vehicle parameter. The method 300 includes determining 301 a user profile 210 of a user of the system 100. In this context, the user profile 210 includes user-specific values of one or more user parameters 214 which describe (correspond to) one or more characteristics of the user of the system 100. In addition, the method 300 includes providing 302 a mapping function which maps different values of the one or more user parameters 214 of the user profile 210 onto different values (i.e. the functional values) of the system parameter 204.

Furthermore, the method 300 includes determining 303 the user-specific value of the system parameter 204 for the user, on the basis of the user profile 210 of the user and on the basis of the mapping function. In particular, the user-specific value of the system parameter 204 can be determined as a function value of the mapping function for the user-specific values of the one or more user parameters 214.

The method described in the present document and the corresponding device have a number of advantages. Due to the abstraction by use of a user profile 210, an arbitrary number of vehicle parameters 204 can be acquired and their values specified without increasing the outlay for the user. The user can specify their profile 210 via a few user parameters 210. From the profile 210, values can then be derived for all vehicle parameters 204 to be acquired. Specifying the user profile 210 can partially also take place in an automated manner via an analysis of the user's behavior.

The vehicle configuration resulting from a user profile 210 is typically balanced automatically since dependencies between the vehicle parameters 204 can be taken into consideration indirectly via similarities in their mapping rules. The user can efficiently perform changes in the vehicle configuration since the user can simultaneously and consistently change many related vehicle parameters 204 with few commands. The interested user can additionally be provided with access to individual vehicle parameters 204 which cannot be changed without using a user profile 210 since otherwise the number of possible vehicle parameters 204 in a menu 100 would become too large and too unclear. By means of a search function, it is possible to ensure that a particular vehicle parameter 204 can be found quickly and, if necessary, changed individually.

The method described in the present document can be applied generally in systems in which there is an interaction between person and system. The method can be applied, in particular, when parameters of the system are to be configured, the specific configuration significantly depending on the desires or requirements of the user. Furthermore, the method can be applied when the values of a large number of dependent system parameters are to be specified. The simplification consists in that only a finite, small number of independent decisions are to be made (during the specification of the values of the user parameters) and the values of the actual system parameters can be derived from these decisions.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for setting a user-specific value of a system parameter of a vehicle system, the method comprising the acts of:
    determining a user profile of a user, wherein the user profile comprises user-specific values of one or more user parameters, each user parameter describing one or more characteristics of a user of the vehicle system without direct reference to the system parameter;
    providing a mapping function which maps different values of the one or more user parameters of the user profile to different values of the system parameter, such that each mapped system parameter value is determinable solely from mapped user parameter values;
    determining the user-specific value of the system parameter for the user, on the basis of the user profile of the user and on the basis of the mapping function; and
    setting the system parameter of the vehicle system to the determined user-specific value of the system parameter.

2. The method as claimed in claim 1, the method further comprising the act of: outputting the user-specific value of the system parameter to the user.

3. The method as claimed in claim 1, wherein determining the user-specific value of the system parameter comprises the act of: determining a function value of the mapping function for the user-specific values of the one or more user parameters of the user profile of the user.

4. The method as claimed in claim 1, wherein determining the user profile comprises the act of: acquiring the user-specific values of the one or more user parameters via a user interface.

5. The method as claimed in claim 4, wherein determining the user profile comprises the acts of:
    displaying a graphical user interface for specifying the user-specific values of the one or more user parameters on a screen; and
    acquiring specified user-specific values of the one or more user parameters via an input unit.

6. The method as claimed in claim 1, wherein the system comprises a vehicle; and the system parameter comprises a vehicle parameter.

7. The method as claimed in claim 1,
    wherein the method further comprises:
    providing a multiplicity of mapping functions for a corresponding multiplicity of system parameters;
    determining user-specific values of the multiplicity of system parameters for the user on the basis of the user profile of the user and on the basis of the multiplicity of mapping functions; and
    wherein a number of the system parameters is greater than a number of the user parameters.

8. A device for setting a user-specific value of a system parameter of a vehicle system, the device comprising a processor that executes instructions to:
    determine a user profile of a user, the user profile comprising user-specific values of one or more user parameters, each user parameter describing one or more characteristics of a user of the vehicle system without direct reference to the system parameter;
    provide a mapping function which is configured to map different values of the one or more user parameters of the user profile to different values of the system parameter, such that each mapped system parameter value is determinable solely from mapped user parameter values;
    determine, on the basis of the user profile of the user and on the basis of the mapping function, the user-specific value of the system parameter for the user; and
    set the system parameter of the vehicle system to the determined user-specific value of the system parameter.

9. The device as claimed in claim 8, said device comprising an input/output unit which enables the user to:
    in a first mode, specify the user-specific values of the one or more user parameters; and
    in a second mode, specify the user-specific value of the system parameter.

10. The device as claimed in claim 9, wherein the processor further executes instructions to:
    acquire data with respect to a behavior of the user; and
    determine and/or adapt the user-specific values of the one or more user parameters on the basis of the acquired data.

11. The device as claimed in claim 8, wherein the processor further executes instructions to:
    acquire data with respect to a behavior of the user; and
    determine and/or adapt the user-specific values of the one or more user parameters on the basis of the acquired data.

* * * * *